(12) United States Patent
Bohlig et al.

(10) Patent No.: US 7,918,343 B2
(45) Date of Patent: Apr. 5, 2011

(54) SYSTEMS AND METHODS FOR GLASS RECYCLING AT A BENEFICIATOR

(75) Inventors: James W. Bohlig, Cuttingsville, VT (US); Sean P. Duffy, Huntersville, NC (US)

(73) Assignee: Casella Waste Systems, Inc., Rutland, VT (US)

( * ) Notice: Subject to any disclaimer, the term of this patent is extended or adjusted under 35 U.S.C. 154(b) by 0 days.

(21) Appl. No.: 10/989,425

(22) Filed: Nov. 17, 2004

(65) Prior Publication Data

US 2005/0173306 A1 Aug. 11, 2005

Related U.S. Application Data

(60) Provisional application No. 60/534,688, filed on Jan. 8, 2004, provisional application No. 60/520,311, filed on Nov. 17, 2003.

(51) Int. Cl.
*B03B 7/00* (2006.01)
(52) U.S. Cl. ............. 209/12.1; 209/21; 209/30; 209/31; 209/33; 209/44.4
(58) Field of Classification Search ............ 209/21, 209/30–37, 44.4, 567, 580, 581, 656; 241/24.12–24.14, 24.19, 24.21–24.22, 24.3, 241/24.03
See application file for complete search history.

(56) References Cited

U.S. PATENT DOCUMENTS

| | | | | |
|---|---|---|---|---|
| 3,003,886 A | | 10/1961 | Pither | |
| 3,802,558 A | * | 4/1974 | Rhys | 209/557 |
| 3,897,330 A | * | 7/1975 | Rhys | 209/557 |
| 5,314,071 A | * | 5/1994 | Christian et al. | 209/4 |
| 5,333,797 A | * | 8/1994 | Becker et al. | 241/19 |
| 5,344,025 A | * | 9/1994 | Tyler et al. | 209/35 |
| 5,533,628 A | * | 7/1996 | Tao | 209/580 |
| 5,611,493 A | | 3/1997 | Hayashi et al. | |
| 5,641,072 A | * | 6/1997 | Otake | 209/524 |
| 5,655,664 A | * | 8/1997 | Barrett | 209/212 |
| 5,718,737 A | | 2/1998 | Mosch | |
| 5,894,938 A | * | 4/1999 | Ichise et al. | 209/559 |
| 5,902,976 A | * | 5/1999 | Beasley | 209/164 |
| 5,911,327 A | * | 6/1999 | Tanaka et al. | 209/580 |
| 6,136,590 A | * | 10/2000 | Kruse | 435/262 |
| 6,144,004 A | | 11/2000 | Doak | |
| 6,230,521 B1 | | 5/2001 | Lehman | |
| 6,401,936 B1 | | 6/2002 | Isaacs et al. | |
| 6,464,082 B1 | * | 10/2002 | Kimmel et al. | 209/12.1 |
| 6,484,886 B1 | | 11/2002 | Isaacs et al. | |
| 7,302,407 B2 | | 11/2007 | Bohlig et al. | |
| 7,341,156 B2 | | 3/2008 | Bohlig et al. | |
| 7,351,929 B2 | | 4/2008 | Afsari et al. | |
| 7,355,140 B1 | | 4/2008 | Afsari | |
| 2003/0001726 A1 | | 1/2003 | Moore | |

OTHER PUBLICATIONS

Form PCT/ISA/220: Notification of Transmittal of the International Search Report and the Written Opinion.
Form PCT/ISA/210: International Search Report from PCT Application No. PCT/US2005/039464 dated Dec. 4, 2006.
Form PCT/ISA/237: Written Opinion from PCT Application No. PCT/US2005/039464 dated Dec. 4, 2006.

* cited by examiner

*Primary Examiner* — Terrell H Matthews
(74) *Attorney, Agent, or Firm* — Wilmer Cutler Pickering Hale and Dorr LLP

(57) ABSTRACT

The invention provides systems and methods for obtaining recycled mixed cullet at a beneficiator. The recycled mixed cullet can be used by glass plants to make new glass articles, such as beverage bottles.

12 Claims, 2 Drawing Sheets

SYSTEMS AND METHODS FOR GLASS RECYCLING AT A BENEFICIATOR

RELATED APPLICATIONS

This application claims priority under §119 to U.S. Application No. 60/534,688 filed Jan. 8, 2004, and to U.S. Application No. 60/520,311 filed Nov. 17, 2003, the disclosures of which are incorporated by reference herein.

FIELD OF THE INVENTION

The invention provides systems and methods for recycling glass at a beneficiator.

BACKGROUND OF THE INVENTION

Cost-effective recycling of materials, such as glass, has become an increasingly important issue to many businesses due, for example, to ever increasing legislative mandates at the federal, state and local levels, and the associated cost of complying therewith. In a recycling process, an entity such as a beneficiator can face several significant challenges, particularly with regard to color sorting and recovery of sufficiently clean glass.

A beneficiator is an entity, within an overall glass recycling system, that typically receives glass from one or more material recovery facilities (MRFs), and further sorts, cleans, and/or otherwise prepares the glass so that it can be used as a raw material, for example, in bottle production. A MRF generally serves as a drop off and gross sorting point for recycled materials so that recycled material such as glass can be transported, for example, to a beneficiator for subsequent processing.

A conventional beneficiator generally processes and cleans glass through two separate processing "lines," or stages (hereinafter lines). The lines do not have to be physically separate, but rather can be different stages or aspects of an integrated process.

The first line is used to mechanically and/or manually sort glass by color (e.g., flint, amber, green), and remove contaminants. Color sorting is necessary because conventional glassmaking techniques require that like-colored glass be recycled together. A conventional beneficiator usually processes one color of glass at a time, particularly when automated optical sorting is performed, generally due to the added cost associated with providing the equipment and/or labor that would enable two or more colors of glass to be simultaneously color sorted. If a conventional beneficiator sorts two or more colors (e.g., flint and amber) of glass, the entire glass stream must proceed through a series of color-specific optical sorters, or proceed through the line multiple times, once for each color of glass.

The second line is used to further clean, screen, and/or crush glass to achieve size uniformity. For example, the second line may be used to remove ceramics and other contaminants from the glass stream. The second line often; however, is inactive, as the line must wait for the first line to finish processing before receiving the glass stream.

Pieces of mixed color (e.g., flint, amber, green) glass smaller than about 10 centimeters in size are referred to as mixed cullet or residue (hereinafter mixed cullet). A conventional beneficiator typically amasses stockpiles of mixed cullet, which is typically used either as a landfill cover material, or is further processed, at an additional cost, so that it can be used, for example, as a paving material such as glasphalt (a highway paving material in which recovered ground glass replaces some of the gravel in asphalt) and/or aggregate (material such as glass, sand or small stones mixed with a binder such as cement to produce mortars and concrete).

The beneficiator must color sort the mixed cullet if it wants to extract a higher value therefrom. Current manual and automated sorting methods are labor intensive and costly. Moreover, color sorting of mixed cullet is generally not economically viable. The beneficiator may also blend mixed cullet into the color sorted glass, but is limited by the amount of cullet that can be blended into the separated glass because separated glass colors must generally ship with, for example, a maximum 5% color contamination. Beneficiators thus have a growing supply of mixed cullet, which surpasses available supplies of color sorted material to which it may be added.

There is a need in the art for more economically viable methods of using mixed cullet and more economically viable systems and methods for beneficiators to recycle and process mixed cullet. The invention is directed to these, as well as other, important ends.

SUMMARY OF THE INVENTION

The invention provides systems for recovering mixed color cullet from waste material comprising: a feed hopper to receive waste material; wherein the waste material comprises mixed color cullet, ferrous material and ceramic material; and wherein the mixed color cullet comprises green glass, flint glass and amber glass; a ferrous separator to remove the ferrous material from the waste material; a ceramic detector and separator to remove ceramic material from the waste material; and an output hopper to receive the mixed color cullet. The systems may optionally further comprise one or more apparatus selected from the group consisting of an air classifier, an optical sorter, a washing station, a shaker-feeder station, and a drying station.

The invention provides methods for obtaining mixed cullet from waste material comprising receiving waste material comprising a first mixed cullet and contaminants; wherein the first mixed cullet comprises green glass, amber glass and flint glass; and wherein the contaminants comprise ceramic material and ferrous material; removing the contaminants from the waste material to yield the first mixed cullet; sorting the first mixed cullet to provide a second mixed cullet comprising about 40% to about 90% by weight flint glass; about 5% to about 40% by weight amber glass; and about 1% to about 30% by weight green glass; and obtaining the second mixed cullet in a receiving hopper. The step of sorting the first mixed cullet to provide the second mixed cullet can be conducted with an optical sorter.

The invention provides methods for producing mixed cullet comprising receiving waste material comprising a first mixed cullet and contaminants; wherein the first mixed cullet comprises green glass, amber glass and flint glass; separating the mixed cullet from the contaminants; adding the mixed cullet in an amount greater than 5% by weight to a single color glass stream to produce a second mixed cullet; and obtaining the second mixed cullet in a receiving hopper. In one embodiment, the mixed cullet is added to the single color glass stream in an amount greater than 10% by weight.

The invention provides methods for improving the efficiency and productivity of a beneficiator comprising receiving waste material comprising mixed cullet and contaminants; wherein the mixed cullet comprises green glass, amber glass and flint glass; and wherein the contaminants comprise ceramic material and ferrous material; separating the mixed cullet from the contaminants; and providing the mixed cullet to a glass manufacturer; wherein the method excludes a step of separating the green glass, amber glass and flint glass in the mixed cullet by the beneficiator.

These and other aspects of the invention are described in more detail herein.

FIGURES

DETAILED DESCRIPTION OF THE INVENTION

The inventors have determined that it would be advantageous to simplify the glass sorting and cleaning process that can be used by a beneficiator; it would be advantageous to enable a beneficiator to recycle glass without having to sort the glass by color; it would be advantageous to enable a beneficiator to process mixed cullet as well as single-colored glass; and it would be advantageous to enable a beneficiator to combine increasing quantities of mixed cullet with a color sorted glass stream; and it would be advantageous to enable a beneficiator to supply glass plants with cullet that can be used in conjunction with, for example, the de-coloring/coloring technology described in U.S. Pat. Nos. 5,718,737 and 6,230,521, the disclosures of which are incorporated by reference in their entirety.

Figure 1:
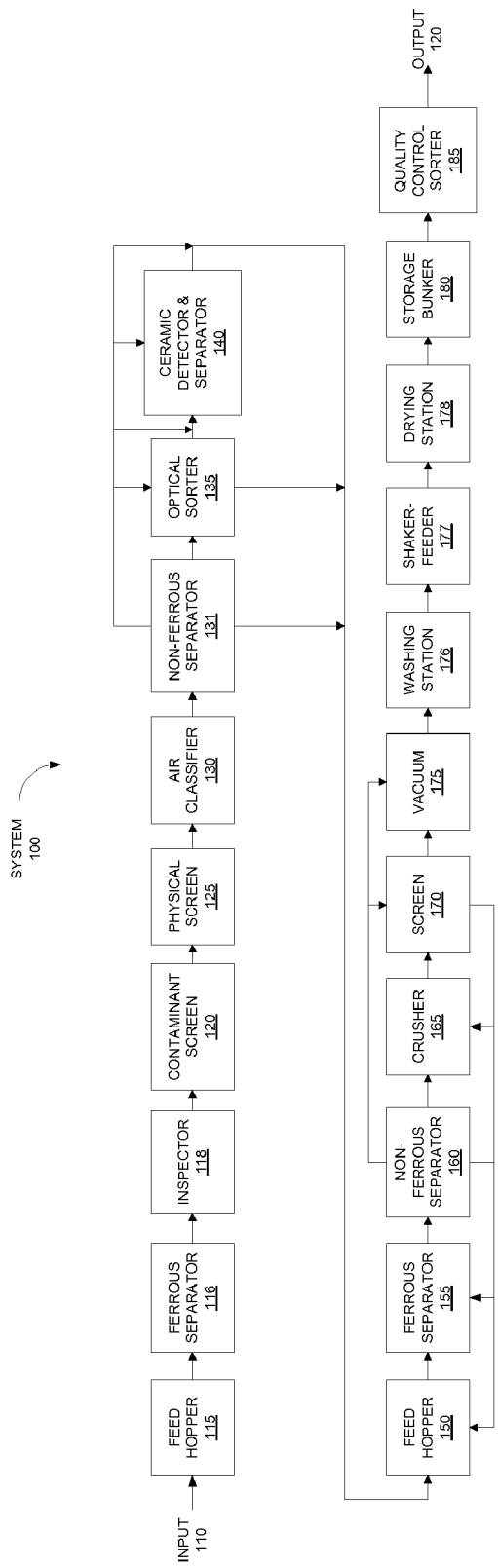
FIG. 1 is a block diagram of an exemplary glass recycling system of the invention that can process glass of mixed color and size.

FIG. 1, generally at 100, illustrates a block diagram of an embodiment of an exemplary beneficiator glass recycling system in accordance with the invention. The method of FIG. 1 utilizes the following sequential, non-sequential, or sequence independent steps for processing waste material that is input 110 into the system 100. The method described in FIG. 1 is exemplary, and may performed in different orders and/or sequences as dictated or permitted by system 100, and any alternative embodiments thereof. In addition, the method described herein is not limited to the specific use of system 100, but may be performed using any system that is capable of obtaining the material(s) as described in connection with system 100.

System 100 can include a feed hopper 115, a ferrous separator 116, an inspector 118, a contaminant screen 120, a physical screen 125, which may have or otherwise utilize a crusher, an air classifier 130, a non-ferrous separator 131, an optical sorter 135, and/or a ceramic detector and separator 140. System 100 can also include a second feed hopper 150, a second ferrous separator 155, a second non-ferrous separator 160, a crusher 165, a screen 170, a vacuum 175, a storage bunker 180, and/or a quality control sorter 185. In addition, there is a stream or source of input 110. Output 190 is generally glass (e.g., mixed cullet) that can be provided to a glass plant which can use the output 190 to make products, such as glass bottles. One or more conveyor systems are generally used to transport input 110 between at least some of the equipment described above. Numerous arrangements of the various equipment can be used. In addition, not all equipment described herein need be used in all embodiments.

Input 110, which is usually obtained from a conventional MRF, but may also come from a variety of other sources such as companies providing services for state mandated bottle bills, bottlers' plant scrap and/or haulers handling material generated at commercial establishments such as restaurants. Input 110 generally includes mixed color (e.g., flint, green, and/or amber) glass bottles, either whole or broken, of varying sizes and shapes, that are mixed in with contaminants such as paper, plastics, aluminum, metals, ceramics, and the like. More particularly, input 110 may also include contaminants such as dishware, heat-resistant glass, porcelain, mirror glass, light bulbs, plate glass, concrete, stones, dirt, metal, plastic lids and/or plastic lid rings.

Feed hopper 115 is a standard industrial hopper that receives input 110 and "feeds" input 110 to a conveyor belt or line. For example, model D-20 manufactured by ABCO Engineering Corp., Oelwein, Iowa may be used. Input 110 then passes under a standard magnetic or electromagnetic separator, such as ferrous separator 116, which removes ferrous material from the remainder of input 110. Ferrous separator 116 may utilize a magnetic belt separator that moves like a conveyor belt, carrying input 110 to a stripper magnet for controlled discharge. In one embodiment, a stainless steel section on existing conveyor installations may be used for maximum magnet effectiveness. A ferrous separator such as manufactured by Eriez Magnetics, Erie, Pa., may be used.

Inspector 118 is a human inspector who sorts through input 110 and removes large pieces of contaminants therefrom. Contaminant screen 120, physical screen 125, ceramic detector and separator 140, and screen 170 are standard, automated screening mechanisms such as disc screens, vibratory deck screens, and trommels that are configured to mechanically separate specific contaminants (e.g., plastic and metal material) from the glass within input 110.

The main design concept and operating principle of a screen is to remove recyclables negatively from input 110. This reduces the need for labor-intensive removal by positively picking the material from input 110, though one or more manual sorters may be utilized to further inspect the material and remove miscellaneous contaminants. A trommel is a rotating cylindrical screen that is inclined at a downward angle with the respect to the horizontal. Material is fed into the trommel at the elevated end, and the separation occurs while the material moves down the drum. The tumbling action of the trommel effectively separates materials that may be attached to each other.

In particular, contaminant screen 120 further screens for contaminants that exceed a predetermined size and that were not removed by inspector 118. Contaminant screen may be a disk screen manufactured by Bulk Handling Systems, Eugene, Oreg. However, other types of screens, such as a vibratory deck screen, may also be used. Contaminant screen and/or the size of the screen that is to be used with contaminant screen 120 can be selected to accommodate the predetermined size. Before contaminant screen 120, a crusher (not shown) may be used to allow glass to be sized reduced and fall through screen 120, while other items that do not crush, such as plastic and aluminum containers, will retain their shape and be screened out.

Input 110 proceeds to physical screen 125, which screens out pieces of glass smaller than, for example, approximately 1 centimeter in size because pieces of this size are typically contaminated with ceramics that cannot be detected efficiently by known optical sorters. Physical screen 125 can be a vibrating screen, such as manufactured by General Kinematics Corp, Barrington, Ill. Removal of ceramics from input 110 is desirable because ceramic impurities remaining in the glass stream may adversely affect the glass recycling and manufacturing process, as well as the structural integrity of the finished glass product.

Input 110 then proceeds through a standard air classifier 130, which blows or vacuums away items such as loose paper, labels and plastics from input 110. An air classifier is a device that uses a moving stream of air to separate light waste components (paper, plastic film, textiles, dust, leaves, foil, etc.) from heavy components (glass, metal, wood, bulk plastic, etc.). An air classifier such as manufactured by CP Manufacturing, National City, Calif., may be used.

Non-ferrous separators 131 and 160 are standard separators, such as an eddy-current separator, that separate out items such as aluminum cans and rings, and/or brass, copper, magnesium, and zinc items from the remainder of input 110. An eddy-current separator works through the principle of high-frequency oscillatory magnetic fields, which induce an electric current in a conductive object such as an aluminum can. The oscillating fields can be adjusted to optimize separation. This electric current generates a magnetic field, which causes the object to be repelled away from the primary magnetic field. Conductive particles can be fed either directly into the non-ferrous separator's 131, 160 rotating drum, or onto a belt enveloping the drum. In one or more embodiments of the invention, one or more inspectors 118 may be used in lieu of non-ferrous separator 131 to remove non-ferrous material.

Optical sorter 135 is a standard optical sorting system typically used in conventional beneficiator recycling plants to optically detect and sort glass within input 110 by color. An optical sorter manufactured by Bender & Co. (Austria), represented in the U.S. by Tomen America (Charlotte, N.C.), may be used. However, in system 100, even if optical sorter 135 is present, the use of optical sorter 135 is optional. If optical sorter 135 is not present in system 100, input 110 can proceed from non-ferrous separator 131 to ceramic detector and separator 150, feed hopper 150, or ferrous separator 150, depending on the configuration and/or operational configuration of system 100. If optical sorter 135 is present in system 100, switching optical sorter 135 off may increase the speed at which input 110 can be processed by system 100. In another embodiment, optical sorter 135 can advantageously be used to sort out ceramics if it is not used to color sort the glass in input 110. In yet another embodiment, optical sorter 135 can be used to image and sort input 110 as in a conventional system. For example, multiple optical sorters (not shown) can be provided that respectively sort a particular glass color. The glass colors can be diverted into various lines for processing. In still another embodiment, input 110 can be processed by optical sorter 135 multiple times, with optical sorter 135 selecting a particular color of glass for each run.

Because the invention may process mixed cullet for a glass plant that does not need to process color sorted glass, system 100 does not need to sort glass by color. Moreover, input 110 can advantageously be processed using a single processing line so that different glass colors do not have to be placed on separate lines. Regardless of whether glass within input 110 is separated by color or remains mixed together, the glass can be processed in the same manner by various configurations and/or operational configurations of feed hopper 150, ferrous separator 155, non-ferrous separator 160, crusher 165, screen 170, vacuum 175, storage bunker 180, and/or quality control sorter 185, as described herein.

Ceramic detector and separator 140 can receive input 110 from non-ferrous separator 131, or optical sorter (if used). Ceramic detector and separator 140 can be a standard ceramic remover that extracts ceramic contaminants from glass pieces that are about 1.3 centimeters to about 6.4 centimeters in size. Input 110 may be fed into ceramic detector and separator 140 by a vibrating conveyer belt, which keeps the material in a thin layer. In one embodiment, input 110 enters ceramic detector and separator 140, the glass passes over a plate embedded with fiber optic cables. A pulsing light (usually visible light) is projected through the glass to the fiber optic cables, which detect the position of any opaque material. Ceramic detector and separator 140 then directs one of a series of "air knives" to remove the ceramic material with a burst of air. The Glass ColorSort™, by MSS Inc, Nashville, Tenn. (purchased by CP Manufacturing, National City, Calif.), can be used as an integrated unit that performs the functions of optical sorter 135 and ceramic detector and separator 140.

A crusher, such as described above in connection with contaminant screen 120, may be used to reduce glass to a predetermined size, since ceramic detector and separator 140 operates more efficiently when processing pieces of glass ranging in size from, for example, about 1.3 centimeters to about 6.4 centimeters in size.

Feed hopper 150 receives input 110 from non-ferrous separator 131, optical sorter 135 or ceramic detector and separator 140, depending on the configuration used, as described above. Alternatively, if feed hopper 150 is not utilized, input 110 can proceed from non-ferrous separator 131, optical sorter 135 or ceramic detector and separator to ferrous separator 155.

Input 110 proceeds to ferrous separator 155, which can be a separator as described above with regard to ferrous separator 116. Ferrous separator 155 extracts any remaining ferrous material from the stream with industrial magnets. The stream then passes through non-ferrous separator 160, which removes any remaining non-ferrous metals such as lids, rings, and cans. Non-ferrous separator 160 can be a separator as described above with regard to non-ferrous separator 131. In an alternate embodiment, ferrous separator 155 and/or non-ferrous separator 160 can be eliminated if ferrous separator 116 and/or non-ferrous separator 131, respectively, clean input 110 to the desired level.

Crusher 165 is a standard crushing unit that crushes or smashes glass to a predetermined size for further processing or handling. For example, model HMG-40, manufactured by C.S. Bell Co., Tiffin Ohio, may be utilized. Crushed glass may also enable system 100 to process input at an increased throughput rate. Pieces of glass greater than about 1.6 centimeters are then optionally screened out by screen 170, and returned to crusher 165 for further crushing before traveling to vacuum 175, which removes or substantially removes debris and other contaminants, such as labels, bits of paper, plastics and/or other contaminants. Screen 170 may be a standard finger screen.

In another embodiment of the invention, if crusher 165 and screen 170 are not used, pieces of glass having a size equal to or smaller than 1.6 centimeters proceed from non-ferrous separator 160 to vacuum 175, and pieces larger than about 1.6 centimeters proceed from non-ferrous separator 160 to feed hopper 150 if used, or alternatively to ferrous separator 155. The pieces larger than about 1.6 centimeters will generally be broken into smaller pieces when circulated back to feed hopper 150 or ferrous separator 155. In yet another embodiment of the invention, if the glass is not crushed, input 110 can proceed from non-ferrous separator 160 to vacuum 175.

In one embodiment, a washing station can be used. The washing station is typically a closed-loop system with multiple screens, operating optimally in the range of about 150° F. to about 170° F. The temperature should be at least 130° F. Additionally, some type of detergent may be used. Typically, a 1% caustic solution such as sodium hydroxide will be ideal. During the washing stage, vibrating water action agitates the glass and thereby loosens solid debris such as label glue, paper fiber and food. Filters are used to keep the circulating water clean and also to remove fine dust and debris. After a thorough washing process, the glass is then rinsed in a monolayer with clean water.

After the washing stage, the glass may be transported by a vibrating conveyer through a shaker-feeder station where a vibrating perforated deck removes bulk moisture from the glass. The purpose of the shaker-feeder station is simply to remove bulk moisture from the glass before subjected to forced hot air during the subsequent drying stage. The shaker-feeder significantly increases the efficiency of the subsequent drying station.

The washed glass from the shaker-feeder station may be further dried by going through a drying station. Typically, the drying station may be a vibrating, forced hot air, fluidized bed using a gas or oil fired heat source. As an example, a 1.5 MBTU gas-fired heat source would be sufficient for this process. The fluid bed dryer which has a perforated stainless steel deck, operates optimally with a supply of forced air from about 180° F. to about 200° F. which should maintain operating temperature of the dryer from about 140° F. to 180° F. After the glass passes through the drying station, the glass is substantially dry with about 0.25% maximum moisture content.

Input 110 is then discharged from vacuum 175 into storage bunker 180, which is a standard storage bin or any holding apparatus, where quality control sorter 185 (e.g., a human sorter) removes any remaining contaminants. At output 190, the cleaned glass may be shipped to an entity such as a bottle manufacturer for use in bottle production.

Thus, embodiments of the invention advantageously provide beneficiators with enhanced processing capabilities, particularly since system 100 provides the option of whether or not to color sort. Beneficiators will no longer be required to color sort mixed cullet, and will no longer need to dilute glass separated by color with mixed cullet in order to realize significant value from the mixed cullet.

Figure 2:
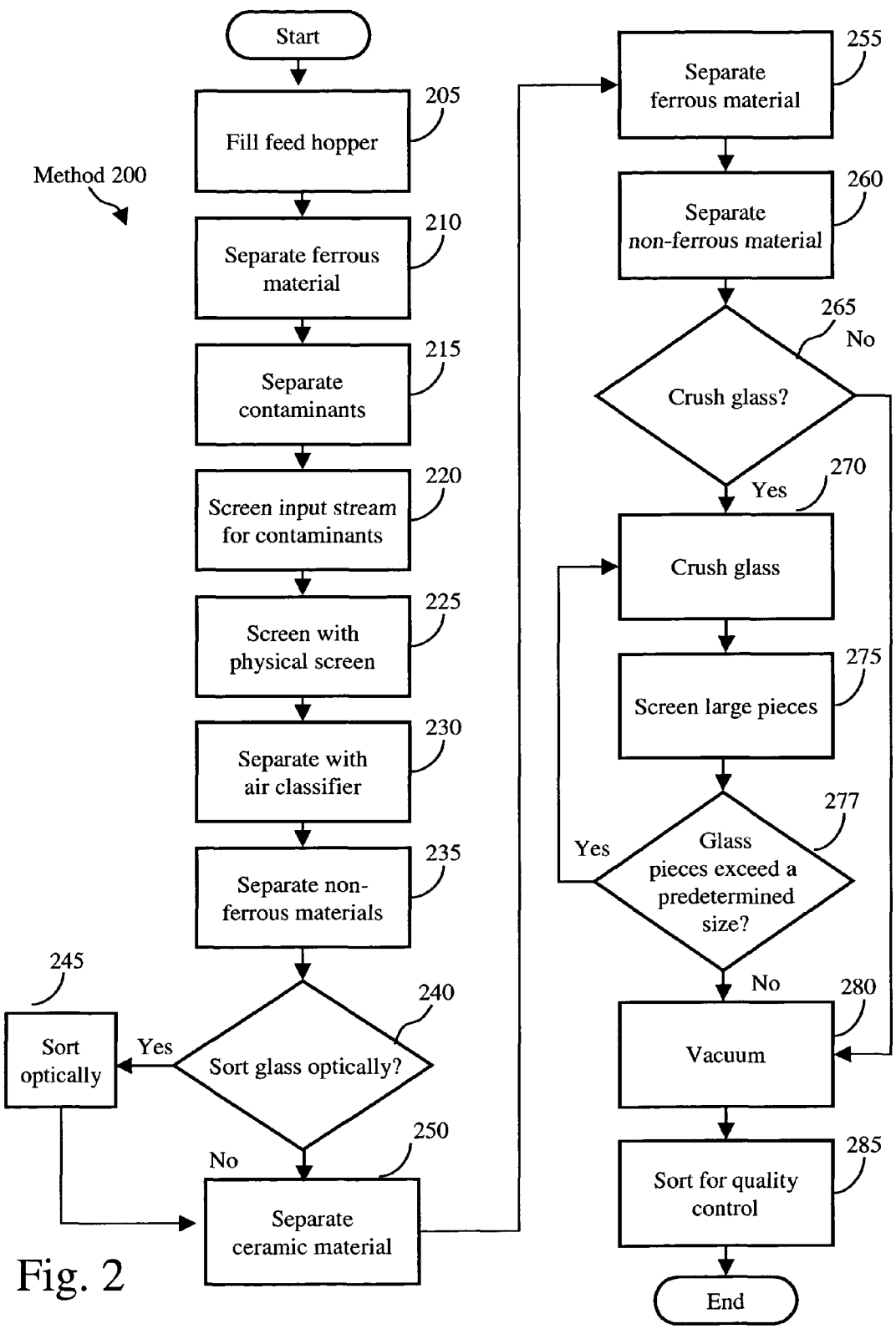
FIG. 2 is a flow diagram illustrating an exemplary method of the invention for preparing recycled glass for use at a glass plant.

FIG. 2, generally at 200, illustrates an exemplary method 200 of recycling mixed colored glass supplied to beneficiator glass recycling system 100. The method of FIG. 2 utilizes the following sequential, non-sequential, or sequence independent steps for processing mixed colored glass using, for example, system 100. The method described in FIG. 2 is exemplary, and may performed in different orders and/or sequences as dictated or permitted by system 100, and any alternative embodiments thereof. In addition, the method described herein is not limited to the specific use of system 100, but may be performed using any system that is capable of obtaining the material(s) as described in connection with system 100.

At step 205, input 110 is fed into feed hopper 115. At step 210, ferrous material separator 116 extracts ferrous material from input 110. At step 215, inspector 118 removes contaminants from input 110.

At step 220, input 110 proceeds to contaminant screen 120, which removes or substantially removes contaminants exceeding a predetermined size that have been transported beyond inspector 118. At step 225, physical screen 125 screens out pieces of glass smaller than, for example, about 1 centimeter in size, which are likely to be contaminated with ceramic.

At step 230, air classifier 130 uses currents of air to further remove contaminants, such as bits of paper, labels, and plastics from input 110. At step 235, non-ferrous separator 131 removes non-ferrous materials, such as aluminum containers, from input 110. A human inspector may be used in lieu of non-ferrous separator 131.

At decision step 240, if an optical sorter is used to process input 110, optical sorter 135 performs an optical sort at step 245. When glass is color sorted, multiple optical color sorters 135 may be used to divert glass of a particular color to respective separate conveyor belts within system 100. In another embodiment, optical sorter 135 can also be adjusted to detect various glass colors. Input 110 can pass through optical sorter 135 multiple times so that optical sorter 135 will detect and separate the desired glass color. If optical sorter 135 is not used, at step 250 input 110 can proceed to ceramic detector and separator 140, if used. When glass in input 110 is not color sorted, system 100 can generally process input 110 at a higher throughput.

Feed hopper 150 may optionally be used to receive input 110 from non-ferrous separator 131, optical sorter 135 or ceramic detector and separator 140, depending on the configuration and/or operational configuration of system 100, as described above. If input 110 can proceed directly from non-ferrous separator 131, optical sorter 135 or ceramic detector and separator 140 to ferrous separator 155, then feed hopper 150 need not be utilized, even if present within system 100. If feed hopper 150 is utilized, then at step 255 input 110 proceeds from feed hopper 150 to ferrous separator 155, which is used to further extract metal material from input 110. If feed hopper 150 is not utilized, then input 110 can proceed directly from non-ferrous separator 131, optical sorter 135 or ceramic detector and separator 140 to ferrous separator 155.

At step 260, non-ferrous separator 160 is used to further separate non-ferrous metals, such as aluminum rings and tabs, from input 110. At decision step 265, a determination is made whether to crush glass within input 110. If at decision step 265 it is determined that the glass is to be crushed, in one embodiment, crusher 165 may be used to crush the glass at step 270. At step 275, the crushed glass within input 110 proceeds to screen 170. At decision step 277, a determination is made whether any pieces of the glass within input 110 exceed a predetermined size. If there are pieces of glass smaller than or equal to a predetermined size of, for example, about 1.6 centimeters, at step 280 the smaller glass pieces proceed to vacuum 175. Pieces of glass having a size greater than about 1.6 centimeters are returned to crusher 165 for further crushing. At step 285, quality control sorter performs a final quality inspection of input 110, and removes and final contaminants.

In another embodiment, if it is determined at decision step 265 that glass is to be crushed and crusher 165 is not utilized, at step 270 input 110 can proceed from non-ferrous separator 160 to screen 170, from which pieces of glass smaller than or equal to, for example, about 1.6 centimeters proceed to vacuum 175 at step 280. Pieces of glass having a size greater than about 1.6 centimeters are returned to feed hopper 150 (if used), or to ferrous separator 155 if feed hopper 150 is not used. One or more iterations of transporting input 110 from screen 170 to feed hopper 150 or ferrous separator 155 will further break all or a vast majority of glass down to the desired size.

If at decision step 265 it is determined that glass will not be crushed, at step 280 glass within input 110 proceeds to vacuum 175. At step 285, quality control sorter performs a final quality inspection of input 110, and removes any remaining contaminants. Output 190 is glass that can be shipped to a glass plant for use in a recycling process.

As discussed herein, the beneficiator of the invention can process and cleans glass through two separate processing lines. The lines can be physically separate or they can be partially or totally integrated. In another embodiment of the invention, the first line is used to mechanically and/or manually sort glass by color (e.g., flint, amber, or green) and to remove contaminants. Thereafter, the second or another line is used to mechanically or manually add mixed cullet to the single color cullet and, optionally, to remove contaminants and/or to further clean, screen, and/or crush the cullet to achieve size uniformity. For example, mixed cullet can be added to flint glass; mixed cullet can be added to amber glass; or mixed cullet can be added to green glass. The mixed cullet can be added to the single color cullets in amounts up to about 75% by weight; up to about 50% by weight; up to about 25% by weight; or up to about 10% by weight. When mixed cullet is added to the single color cullet, the mixed cullet generally comprises from about 45% to about 90% by weight flint, about 5% to about 35% by weight amber and from 0 to about 30% by weight green; or from about 50% to about 80% by weight fling, about 10% to about 30% by weight amber and from about 5% to about 25% by weight green. After the single color cullet is combined with the mixed cullet, the resulting product can be used by a glass manufacturer.

Because the beneficiator of the invention can combine single color cullet with mixed cullet, the beneficiator of the invention can be paid to take stockpiles of mixed cullet from conventional beneficiators who typically have to pay to have their stockpiles of mixed cullet removed from their facilities for use in glasphalt or aggregate. Thus, the invention provides an alternative use for the mixed cullet that is generated by conventional beneficiators.

Although the invention has been set forth in detail, one skilled in the art will appreciate that numerous changes and modifications can be made to the invention, and that such changes and modifications can be made without departing from the spirit and scope of the invention.

What is claimed is:

1. A system for recovering mixed color cullet from waste material comprising:
   (i) a feed hopper to receive waste material; wherein the waste material comprises mixed color cullet, ferrous material, non-ferrous metal material, and ceramic material; and wherein the mixed color cullet comprises green glass, flint glass and amber glass;
   (ii) a ferrous separator to remove the ferrous material from the waste material;
   (iii) an eddy-current separator configured to separate conductive and non-conductive materials within the waste material, wherein the conductive particles are removed from waste material by at least one of a rotating drum or a belt enveloping the rotating drum;
   (iv) a ceramic detector and separator to remove ceramic material from the waste material;
   (v) a shaker-feeder, positioned downstream of the eddy-current separator, configured to remove bulk moisture from the waste material;
   (vi) a plurality of optical sorters configured to image and simultaneously sort the waste material in accordance with at least one glass color;
   (vii) a crusher configured to selectively reduce a portion of the waste material to a specific size; and
   (viii) an output hopper to receive the mixed color cullet.

2. The system of claim 1, wherein the crusher is configured to reduce the size of the mixed color cullet to less than about 2 centimeters in size.

3. The system of claim 1, wherein the waste material further comprise plastic and paper.

4. The system of claim 1, wherein the system further comprises one or more apparatus selected from the group consisting of an air classifier, a washing station, and a drying station.

5. The system of claim 1, wherein the waste material is from a material recovery facility.

6. The system of claim 1, further comprising the optical sorter configured to optically detect and sort glass material by color, wherein the optical sorter is capable of being switched off to increase a processing speed of the waste material.

7. A system for recovering mixed color cullet from waste material comprising:
   (i) a feed hopper to receive waste material; wherein the waste material comprises mixed color cullet, ferrous material, non-ferrous metal material, and ceramic material; and wherein the mixed color cullet comprises green glass, flint glass and amber glass;
   (ii) a ferrous separator to remove the ferrous material from the waste material;
   (iii) an eddy-current separator configured to separate conductive and non-conductive materials within the waste material, wherein the conductive particles are removed from waste material by at least one of a rotating drum or a belt enveloping the rotating drum;
   (iv) a ceramic detector and separator to remove ceramic material from the waste material;
   (v) a washing station, positioned downstream of the eddy-current separator, to wash solid debris from the mixed color cullet;
   (vi) a shaker-feeder configured to remove bulk moisture from the washed mixed color cullet;
   (vii) a plurality of optical sorters configured to image and simultaneously sort the waste material in accordance with at least one glass color;
   (viii) a drying station configured to dry the mixed color cullet from the shaker-feeder;
   (ix) a crusher configured to selectively reduce a portion of the waste material to a specific size; and
   (x) an output hopper to receive the mixed color cullet.

8. The system of claim 7, wherein the washing station is a closed-loop system with a plurality of screens.

9. The system of claim 8, wherein the plurality of screens is operated from about 150° F. to about 170° F.

10. The system of claim 7, wherein the drying station is selected from the group consisting of vibrating dryer, forced hot air dryer, fluidized bed dryer, and an oil fired dryer.

11. The system of claim 2, wherein the glass cullet is returned to the crusher if the glass cullet exceeds the about 2 centimeters predetermined size.

12. The system of claim 1, further comprising a vacuum configured to remove loose debris from the glass cullet not selectively crushed.

* * * * *